(12) United States Patent
Sheldon et al.

(10) Patent No.: US 9,781,241 B2
(45) Date of Patent: Oct. 3, 2017

(54) CEASE AND DESIST CALL FLAGGING

(71) Applicant: BANK OF AMERICA CORPORATION, Charlotte, NC (US)

(72) Inventors: Andrew Sheldon, Mountain Top, PA (US); David Luke Hallam, Newark, DE (US); Feng Tang, Plano, TX (US); Oleg Gerasimovich, Tucson, AZ (US); Patrick B. Smith, Garland, TX (US)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 14/482,900

(22) Filed: Sep. 10, 2014

(65) Prior Publication Data

US 2016/0072938 A1    Mar. 10, 2016

(51) Int. Cl.
*H04M 3/42* (2006.01)
*H04M 1/663* (2006.01)
*H04M 3/38* (2006.01)
*H04M 3/436* (2006.01)

(52) U.S. Cl.
CPC ............. *H04M 1/663* (2013.01); *H04M 3/38* (2013.01); *H04M 3/436* (2013.01)

(58) Field of Classification Search
CPC .. H04M 3/436; H04M 1/663; H04M 3/42059; H04M 3/5175
USPC ............................ 379/201.01–201.02, 210.02
See application file for complete search history.

(56) References Cited

U.S. PATENT DOCUMENTS

| | | | |
|---|---|---|---|
| 7,817,982 | B1 | 10/2010 | Chu et al. |
| 2001/0033643 | A1* | 10/2001 | Mulvey ................. H04M 1/663 379/196 |
| 2011/0128144 | A1 | 6/2011 | Baron, Sr. et al. |
| 2013/0157610 | A1 | 6/2013 | Vainik et al. |
| 2014/0120885 | A1* | 5/2014 | Luneau ............... H04M 3/2281 455/414.1 |
| 2014/0310191 | A1* | 10/2014 | Schobel ............... G06Q 50/265 705/325 |
| 2015/0127396 | A1* | 5/2015 | Sheldon ............... G06Q 30/018 705/7.13 |
| 2015/0244872 | A1 | 8/2015 | Hoover |

* cited by examiner

*Primary Examiner* — Rasha Al Aubaidi
(74) *Attorney, Agent, or Firm* — Michael A. Springs; Moore & Van Allen PLLC; Patrick B. Horne

(57) ABSTRACT

Embodiments of the invention relate to systems, methods, and computer program products for providing cease and desist call flagging. The system, method, and computer program product are configured to provide a user interface for reporting cease and desist requests associated with a plurality of customers; receive, via user input into the user interface, a cease and desist request associated with a customer having at least one account maintained by an entity, wherein the cease and desist request specifies at least one rule to be implemented when contacting the customer; and automatically terminate contact to the customer on behalf of the entity based at least partially on the at least one rule specified in the cease and desist request.

20 Claims, 8 Drawing Sheets

CEASE AND DESIST CALL FLAGGING

BACKGROUND

In 1991, the Telephone Consumer Protection Act (TCPA) was passed by the United Stated Congress and signed into law. One provision of the TCPA prevents automated telephone equipment from dialing any telephone number assigned to a paging service, cellular telephone service, specialized mobile radio service, or other radio common carrier service, or any service for which the called party is charged for the call without the prior express consent of the called party. Thus, there is a need for a system to determine whether a entity has permission to contact a customer via automated telephone equipment.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to apparatuses, methods, and computer program products for providing cease and desist call flagging. An exemplary system may comprise a computer apparatus including a processor and a memory, and a software module stored in the memory, comprising executable instructions that when executed by the processor cause the processor to provide a user interface for reporting cease and desist requests associated with a plurality of customers. The system may then receive, via user input into the user interface, a cease and desist request associated with a customer having at least one account maintained by an entity, wherein the cease and desist request specifies at least one rule to be implemented when contacting the customer. In response to receiving the cease and desist request, the system may automatically terminate contact to the customer on behalf of the entity based at least partially on the at least one rule specified in the cease and desist request.

In some embodiments, the entity contacts the customer using an automated dialer, and automatically terminating contact to the customer on behalf of the entity comprises blocking the automated dialer from dialing one or more telephone numbers associated with the customer.

In some embodiments, a call list comprising the one or more telephone numbers associated with the customer is stored in the memory, and the at least one rules provides a specific telephone number within the call list to be restricted from future contact on behalf of the entity, and automatically terminating contact to the customer on behalf of the entity comprises removing the specific telephone number from the call list such that after removing the specific telephone number from the call list the customer cannot be contacted at the specific telephone number on behalf of the entity.

In some embodiments, the at least one rules provides a specific period of time to be in which the entity is restricted from contacting the customer, and automatically terminating contact to the customer on behalf of the entity comprises restricting the entity from contacting the customer during the specific period of time.

In some embodiments, the customer has a first and second account maintained by the entity, and the cease and desist request is only associated with the first account such that automatically terminating contact to the customer on behalf of the entity comprises determining to not contact a customer based at least partially on determining the reason for contacting the customer is associated with the first account, and determining to contact a customer based at least partially on determining the reason for contacting the customer is associated with the second account.

In some embodiments, the user interface for reporting cease and desist requests is configured to receive at least one reason for reporting the cease and desist request such that at least a portion of the user input within the user interface is automatically populated based at least partially on the at least one reason for reporting the cease and desist request.

In some embodiments, the system is further configured to receive, via user input into the user interface, a request to withdraw the cease and desist request associated with a customer having the at least one account maintained by an entity, wherein the request to withdraw the cease and desist request specifies at least one rule for contacting the customer, and in response to receiving the request to withdraw the cease and desist request, automatically initiate contact to the customer on behalf of the entity based at least partially on the at least one rule specified in the request to withdraw the cease and desist request.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
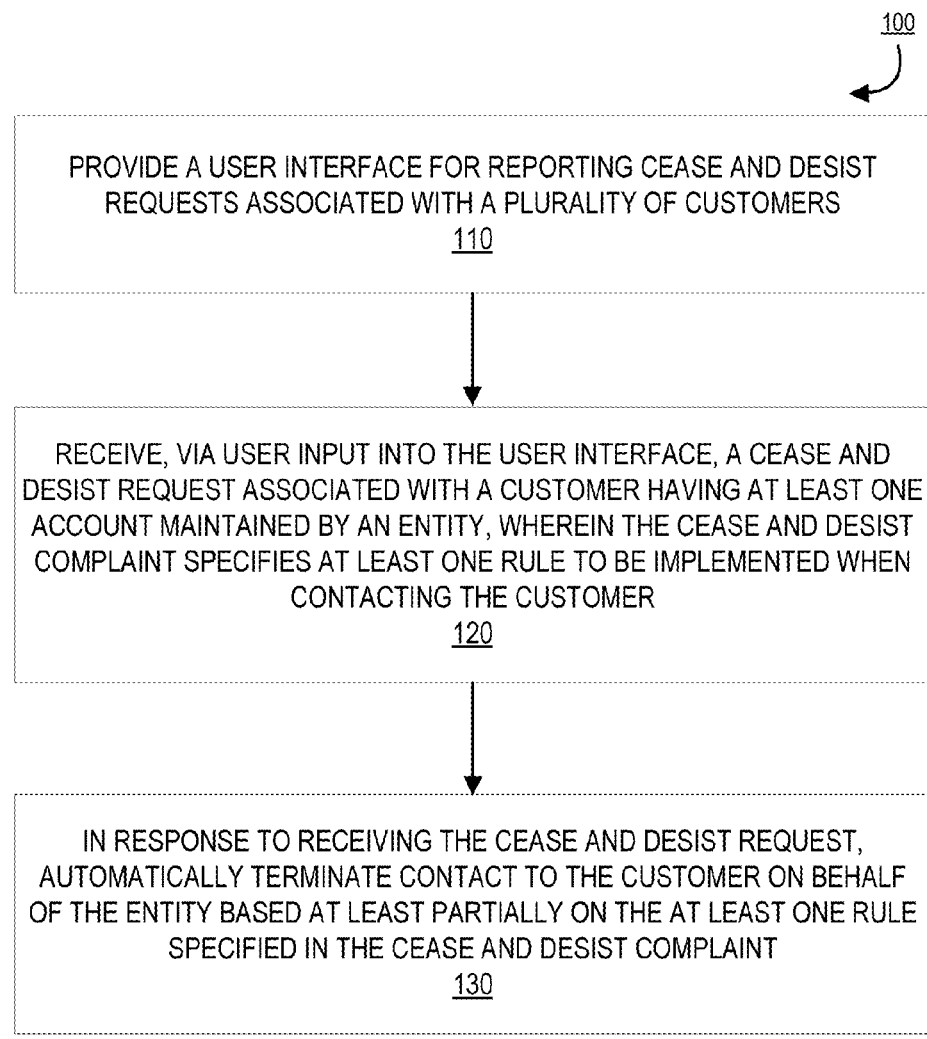
Figure 2:
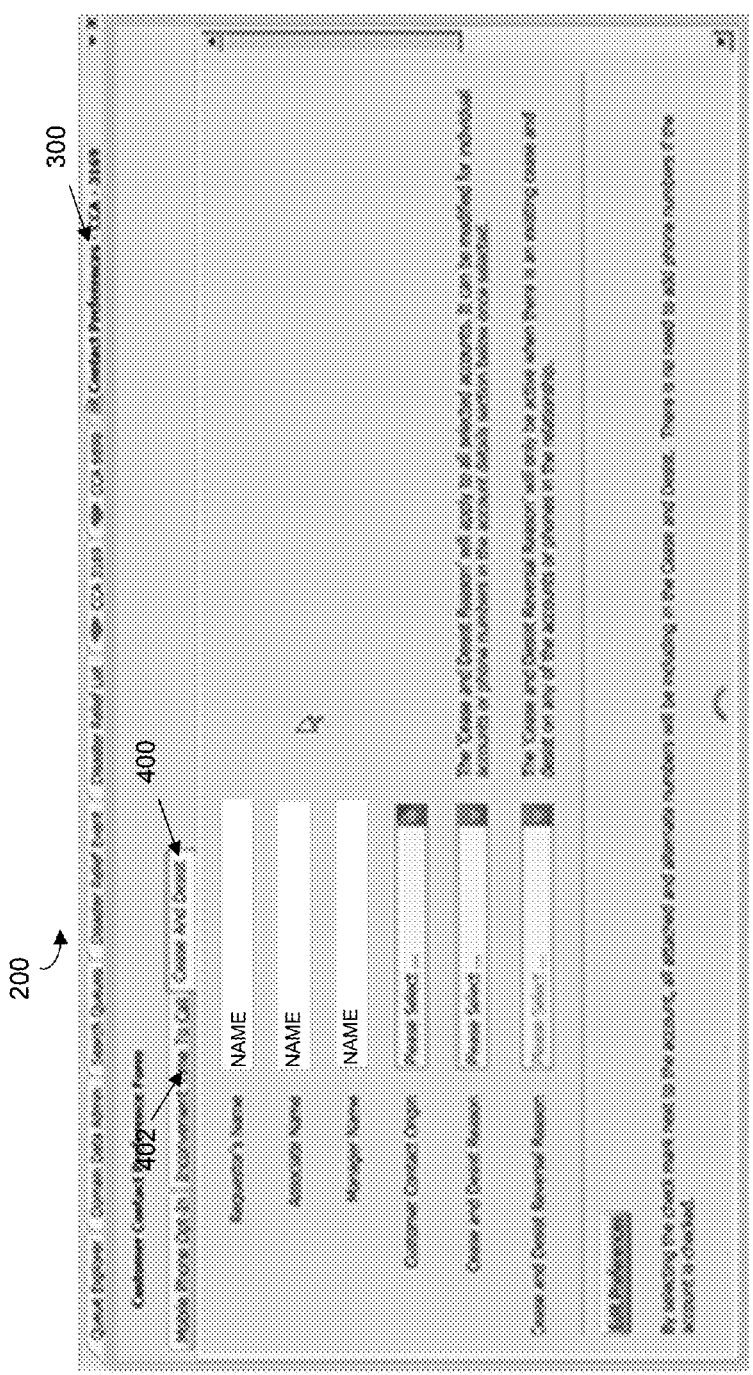
Figure 3:
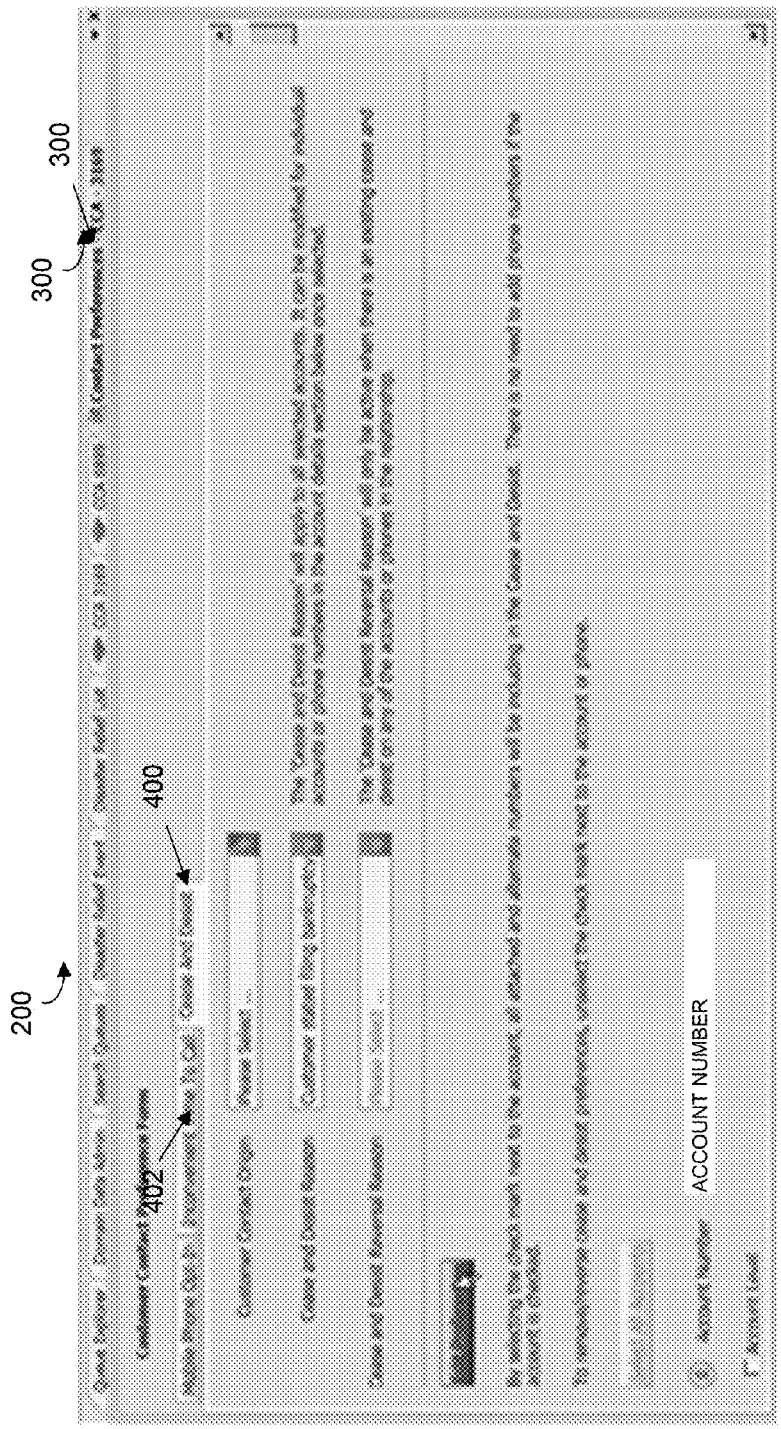
Figure 4:
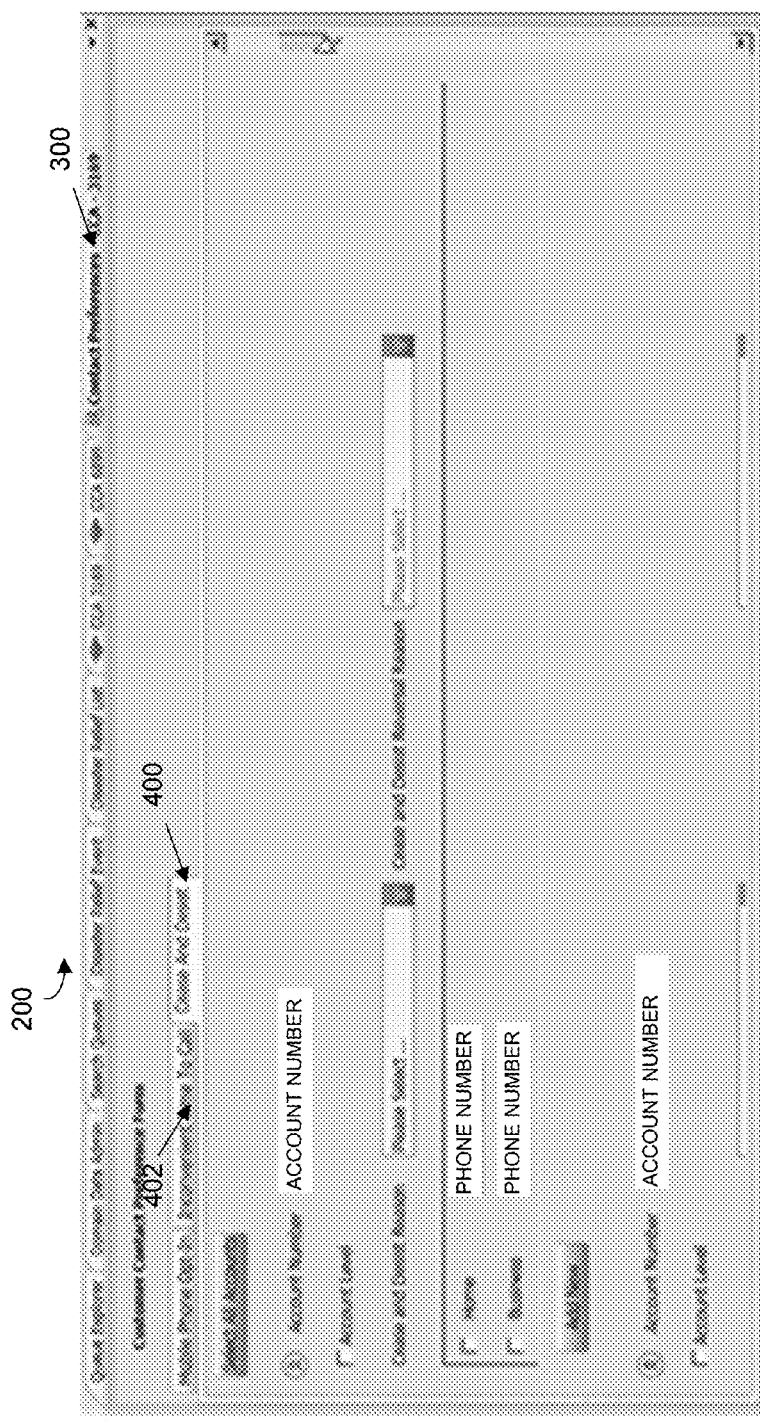
Figure 5:
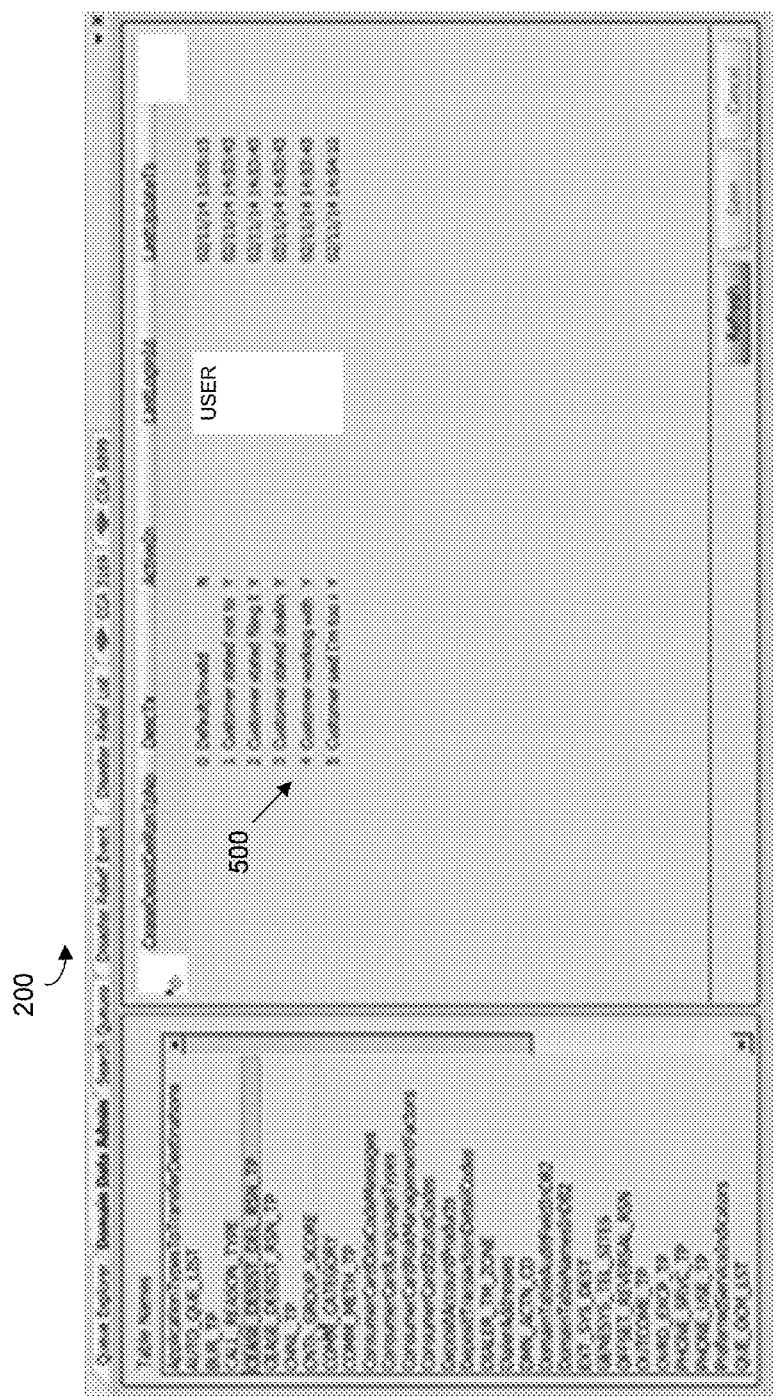
Figure 6:
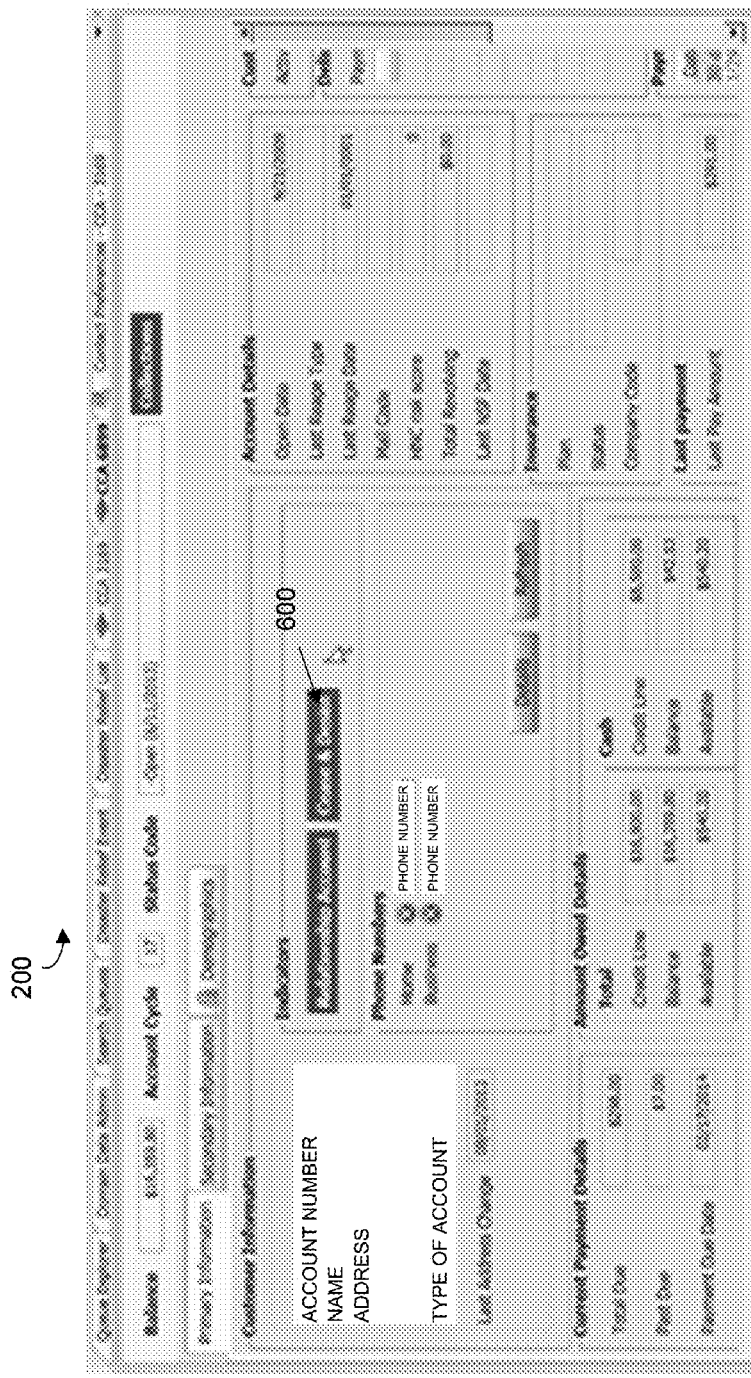
Figure 7:
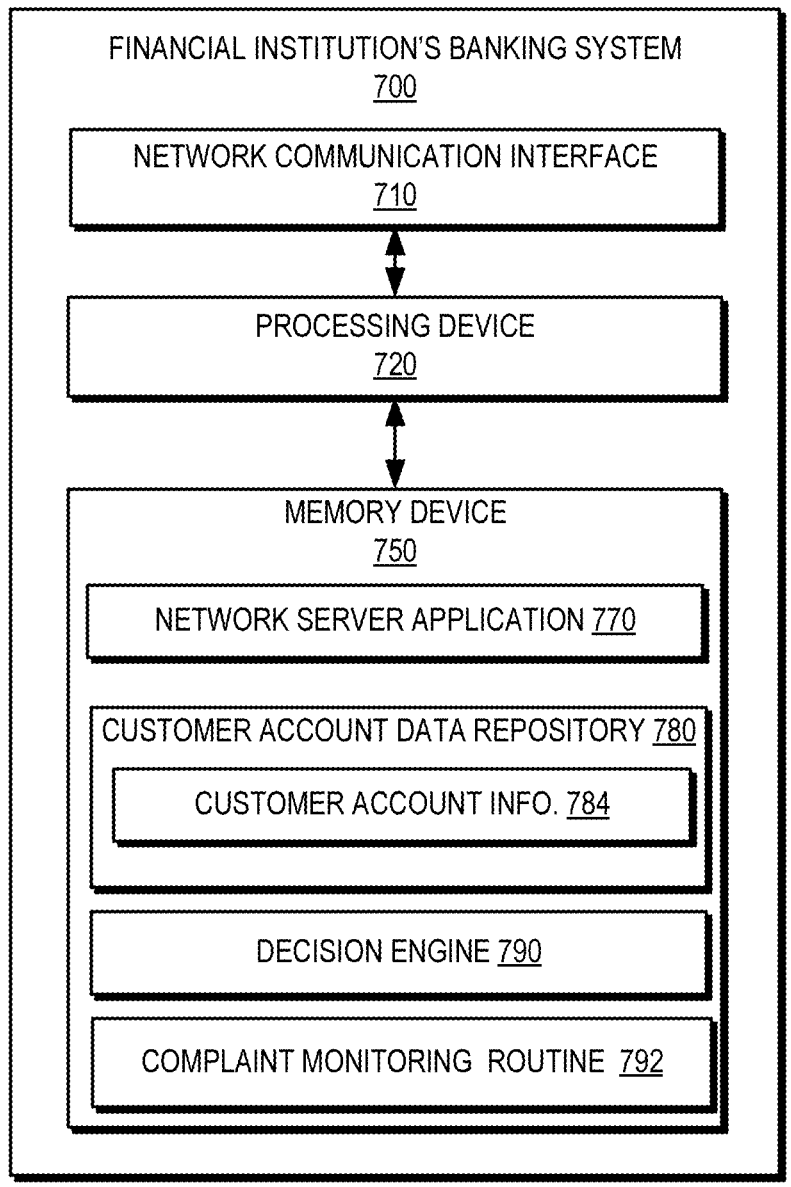
Figure 8:
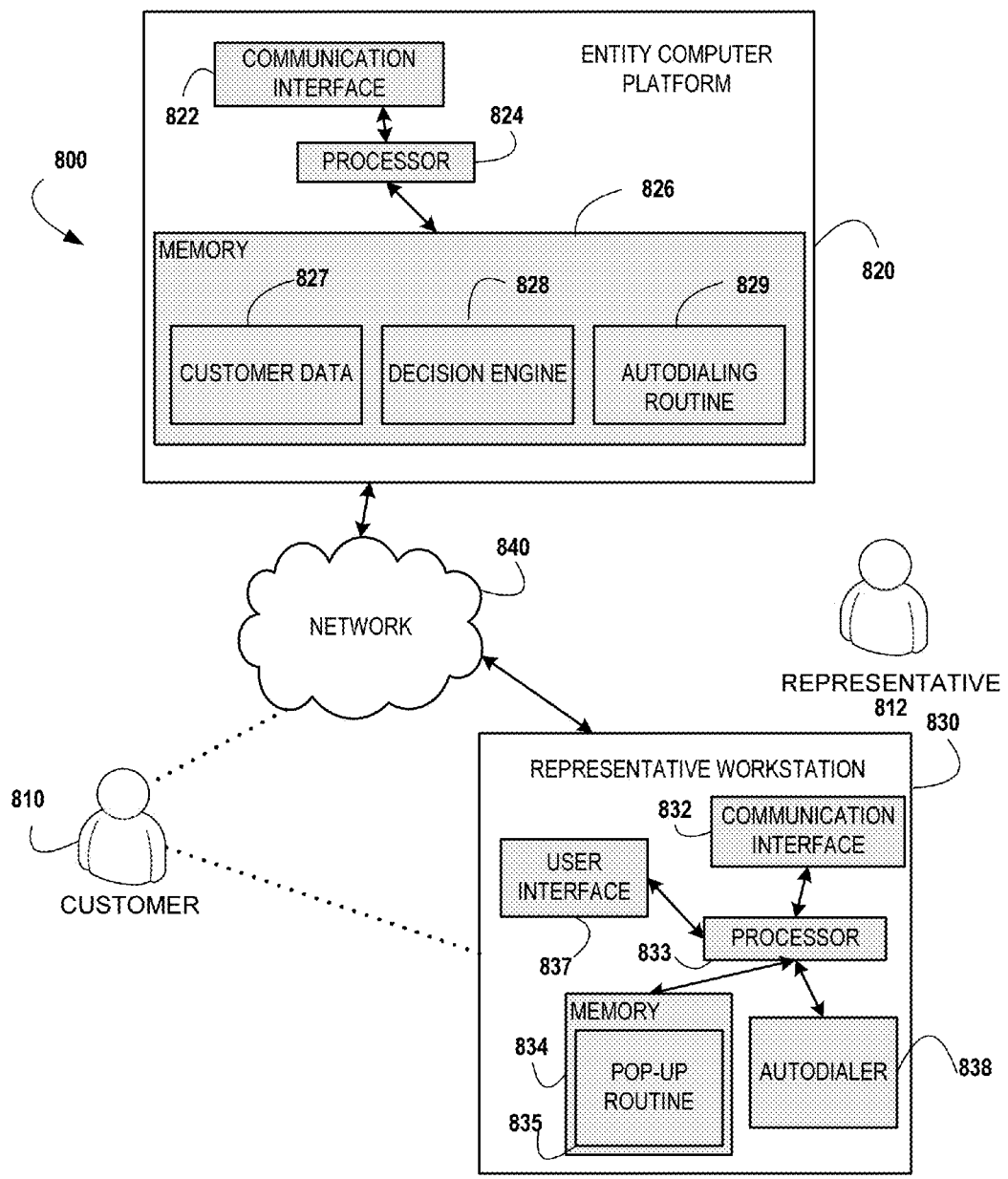

Having thus described embodiments of the invention in general terms, reference will now be made to the accompanying drawings, which are not necessarily drawn to scale, and wherein:

FIG. 1 provides a high level process flow illustrating the unified recovery process, in accordance with one embodiment of the present disclosure;

FIG. 2 is an exemplary screenshot of a graphical representation of user interface for reporting cease and desist requests, in accordance with one embodiment of the present disclosure;

FIG. 3 is an exemplary screenshot of a graphical representation of user interface for reporting cease and desist requests, in accordance with one embodiment of the present disclosure;

FIG. 4 is an exemplary screenshot of a graphical representation of user interface for reporting cease and desist requests, in accordance with one embodiment of the present disclosure;

FIG. 5 is an exemplary screenshot of a graphical representation of user interface for reporting cease and desist requests, in accordance with one embodiment of the present disclosure;

FIG. 6 is an exemplary screenshot of a graphical representation of a primary information screen for a customer, in accordance with embodiments of the disclosure;

FIG. 7 is a block diagram illustrating exemplary technical components of a financial institution banking system, in accordance with an embodiment of the present disclosure; and FIG. 8 is a block diagram of an environment for implementing a system to determine permission to contact, in accordance with an embodiment of the present disclosure.

DETAILED DESCRIPTION OF EMBODIMENTS OF THE INVENTION

Embodiments of the present disclosure now may be described more fully hereinafter with reference to the accompanying drawings, in which some, but not all, embodiments of the disclosure are shown. Indeed, many different forms may be possible and the disclosure should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although embodiments of the present invention described herein are generally described as involving an entity, it will be understood that entity may involve one or more persons, organizations, businesses, institutions and/or other entities such as financial institutions, that implement one or more portions of one or more of the embodiments described and/or contemplated herein.

Thus, apparatus, systems, methods and computer program products are herein disclosed for implementing cease and desist call flagging. Inasmuch as financial institutions often contact customers to discuss accounts and/or offer new products, specific embodiments disclosed herein relate to financial institutions. However, such embodiments are exemplary.

The present invention may be used in conjunction with a unified recovery system where the system is configured to receive cease and desist requests associated with customer communications related to the unified recovery system. The system may compile various recovery programs across an entity. In this way, all recovery programs may be centralized, such that the representative can log into a single system. This eliminates requiring the representative to log into a plurality of software programs in order to view and understand all relationships a customer has with the entity.

The system may determine regulations and internal restrictions associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

The system may utilize the regulations and restrictions to create rules for customer communications. These rules may be created and applied to a customer on a customer-by-customer basis. In this way, each customer, based on the customer's location, telephone number, or the like, may have a unique set of rules applied for him/her based on regulations and/or restrictions that may apply to the customer having payments in arrears for products. Once the rules have been created and applied, the determined rules may be correlated with each individual customer having payments in arrears. In some embodiments, the system to determine permission to contact is also used to determine rules for when a customer may be contacted.

The system may provide a unified application 200 for displaying a customer relationship to an appropriate representative. The unified application 200 has specific regulations, restrictions, and prior customer correspondence associated therewith. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

The system may allow the representative to initiate a communication with the customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

The system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

Method for Providing Cease and Desist Call Flagging

Referring now to FIG. 1, a general process flow 100 is provided for terminating customer contact procedures based on cease and desists requests. In some embodiments, the process flow 100 is performed by a system (i.e., one or more apparatuses) having hardware and/or software configured to perform one or more portions of the process flow 100. In such embodiments, as represented by block 110, the system is configured to provide a user interface for reporting cease and desist requests associated with a plurality of customers. As represented by block 120, the system is also configured to receive a cease and desist request associated with a customer having at least one account maintained by an entity. The cease and desist request may specify at least one rule to be implemented when contacting the customer. As represented by block 130, in response to receiving the cease and desist request, the system is also configured to automatically terminate contact to the customer on behalf of the entity based at least partially on the at least one rule specified in the cease and desist request.

It will be understood that the system having the process flow 100 can include one or more separate and/or different apparatuses. For example, in some embodiments of the invention, a single apparatus (e.g., entity computing platform 820 described in connection with FIG. 4) is configured to perform all of the portions of process flow 100 represented by blocks 110 to 130. However, in some other embodiments, a first apparatus (e.g., entity computing platform 820 described in connection with FIG. 8) is configured to perform the portions of process flow 100 represented by blocks 120 and a second apparatus (e.g., representative workstation 830 described in connection with FIG. 8) is configured to perform the portions of process flow 100 represented by block and 110 and 130.

Regarding block 110, the phrase "cease and desist request" may refer to any written and/or verbal demands for an entity to end any initiation of communication a customer where the entity has previously been responsible for contacting the customer, or is scheduled to contact the customer in the future. The cease and desist request may be communicated on behalf of the customer from a third party entity, or communicated by the customer themselves, to the entity responsible for contacting the customer.

The cease and desist request may be related to customer accounts that have one or more payments in arrears with the entity such that the user interface for reporting cease and deists requests is associated with a unified recovery system, and in particular a unified application 200 to aid in payment in arrears recovery. Prior to providing the user interface for reporting cease and desist requests the system may first identify customer relationships across an entity. In this way, the system may identify all products that a customer may have with the entity across one or more lines of business within the entity. As such, addresses, affiliates, phone numbers, customer products, products with payments that are in arrears and any other information that may be associated with a single customer may be gathered across the lines of business of an entity. The data associated with the customer relationships may be collected and compiled in association with the customer. As such, all relationship data may be stored in association with a customer including those products and/or accounts that are in arrears. The products and/or accounts that have payments in arrears that are associated with that particular customer are then identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

Further concerning block 110, the system may then provide to a unified application 200 to a representative of the entity for customer communications. The unified application 200 provides the representative with an across the entity view of the customer's relationship with the entity as well as information associated with the primary account and other accounts with payments in arrears. The unified application 200 may further provide a user interface for reporting cease and desist requests associated with the customer communications. In some embodiments, providing a user interface for reporting cease and desist requests associated with the customer communications may further comprise presenting a graphical user interface (GUI) for reporting cease and desist requests on a workstation of the entity representative. The representative may then be able to interact with the user interface for the purpose of reporting cease and desist requests associated with the customer communications. In an exemplary embodiment the user interface for reporting cease and desist requests may be directly launched from within the unified application 200 provided to the user. In this way, the unified application 200 may comprise one or more option tabs for selection, where the option tabs may indicate different users interfaces, forms, and/or reporting tools that are available to the representative from within the unified application 200. For example, as illustrated in FIG. 2 through FIG. 6, the option tabs for selection may include, but not be limited to, a queue explorer tab, a domain data administration tab, a search queues tab, a disaster relief event tab, a disaster relief list tab, one or more customer profile tabs, one or more customer contact preferences tab 300s, and the like. It should be noted that any options that are selectable via tabs presented within the unified application 200, may additionally be selectable by others means not contemplated herein, including but not limited to, buttons, voice commands, text commands, and the like.

In an exemplary embodiment, the user interface for reporting cease and desist requests is directly related to the contact preferences form and/or tab 300 such that in response to selecting the contact preferences option 300 a plurality of subsidiary options are presented within the user interface, including an option for reporting cease and desist requests. For example, as illustrated in FIG. 2 through FIG. 4, the option tabs for selection within the contact preferences tab 300 may include, but not be limited to, a mobile phone opt-in tab, an inconvenient time to call tab 402, a cease and desist tab 400, and the like. In some embodiments, the selection options may be based on the entities needs at any given time. In this way, the representative may add and/or remove selectable options that are presented on the user interface based on the needs of the business as they potentially change. For example, an entity may no longer offer a "mobile phone opt-in" option such that personnel associated with the entity may select to edit and/or remove the "mobile phone opt-in" option from within the contact preferences tab 300 and replace it with another option that is relevant to the needs of the business entity.

Further concerning block 110, in response to selecting the cease and desist option from within the customer contact preferences form 300, the system may then present the user interface for reporting cease and desist requests associated with the customer communications. In an exemplary embodiments the user interface for reporting cease and desist requests is embodied by a form presented from within the unified application 200 and configured to receive information related to the cease and desist request communicated on behalf of a particular user. For example, as illustrated in FIG. 2 through FIG. 4, the cease and desist form 400 and/or user interface may be configured to receive information via various input fields such as the requestor name, customer name, associate name, manager name, customer contact origin, cease and desist reason, cease and desist reversal reason, one or more customer preferences, account information, and the like.

Regarding block 120, after providing the user interface for reporting cease and desist requests associated with a plurality of customers, the system may be configured to receive information via the user interface and in particular receive a cease and desist request associated with a customer having at least one account maintained by an entity. The cease and desist request may specify at least one rule to be implemented when contacting the customer. In an exemplary embodiment, the cease and desist request is further associated with and/or related to a financial agreement on behalf of the customer of a financial institution or entity. The received information may be directly inputted into the user interface that is being presented on the representative's workstation. The received information may typically be provided via one or more user input devices associated with the representative's workstation. The user interface may indicate the type and/or categories of information that may be received, where a portion of the information may be required, and a portion of the information may be optional. Methods for receiving information may include, but not be limited to, manually inputting information into the user interface and/or form using an input device, manually selecting options from one or more drop down menus, manually selecting yes or no options using selectable input methods (e.g. radio buttons, check boxes), and the like.

In some embodiments, receiving information via the user interface and/or form for reporting cease and desist requests 400 may further comprise manually receiving information into one or more user input fields within the user interface and/or form for reporting cease and desist requests 400. For example, information received in the manual input fields may include requestor name, customer name, associate name, manager name, and the like. The user input fields may be populated based on user input from the representative associated with the customers cease and desist request.

In some embodiments, receiving information via the user interface and/or form for reporting cease and desist requests 400 may further comprise automatically populating one or more information fields within the user interface and/or form for reporting cease and desist requests 400. In this way, a user may identify on the cease and desist form 400 a reason as to why the customer is requesting for communication to be terminated and/or altered such that the line of business can subsequently segment different types of cease and desist request. The fields may be populated based on one more standards or rules that are provided by the business entity responsible for maintaining the unified application 200. In some embodiments, the field is partially populated based on one or more options presented within a drop down menu in the user interface and/or form for reporting cease and desist requests 400. For example, as illustrated in FIG. 5, the entity may specify via a database table 500 one or more reasons for cease and desist requests to be used in automatically populating the drop down menu associated with the cease and desist reason specified in the user interface and/or request form. The database table 500 may provide various items of information such as a description of the reason for a cease and desist request, whether or not the cease and desist request is active, the time at which the descriptive record was edited, and the login identifier of the last user and/or representative to edit the record. In this way any records within the table may be edited by personnel within the entity and/or associated with the entity. As previously mentioned, the fields may be populated based on one more standards or rules that are provided by the business entity responsible for maintaining the unified application 200. For example, the active column within the database table 500 for cease and desist request reasons may specify "yes" or "no" as to whether a particular reason is active. In this way, an reason that are not active and/or denoted by "no" within the table may subsequently not appear within the drop down menu associated with the cease and desist reason specified in the user interface and/or request form. As illustrated in FIG. 5, reasons for cease and desist requests may include, but not be limited to, default and/or invalid reasons, the customer stating that they wish to not be called, the customer stating that they have filed bankruptcy, the customer stating that they are dealing with an attorney in the intervening matter related to the customer communication attempts, the customer stating that they are dealing with a direct selling agent (DSA) in the matter related to the customer communication attempts, and the like. Other drop down menus associated with the cease and desist user interface and/or form may include a customer contact origin drop down menu and a cease and desist reversal reason drop down menu. In this way, the system may be further configured to receive a request to reverse and/or withdraw the cease and desist request associated with a customer wherein the request to reverse and/or withdraw the cease and desist request specifies at least one rule for contacting the customer. In such an embodiment, as illustrated in FIG. 3, the cease and desist reversal reason may only be active when there is an existing cease and desist request on any of the accounts, or phone numbers associated with the customer.

As previously discussed, in some embodiments the user interface for reporting cease and desist requests is configured to receive at least one reason for reporting the cease and desist request such that at least a portion of the user input within the user interface is automatically populated based at least partially on the at least one reason for reporting the cease and desist request. As shown in FIG. 3 and FIG. 4, a user may "select all accounts" to associate with the cease and desist request with every account that the customer has maintained by the entity, or the user may select to customize the preferences of the cease and desist request at an account level such that is only associated with one or more of the customer's accounts. In such an embodiment, the reason for reporting the cease and desist request may be likewise associated with all of the customer's accounts such that reason will apply to all selected accounts and/or can be modified for individual accounts or phones numbers in the account details sections of the user interface for reporting cease and desist requests. In some embodiments, if a user selects a reason for reporting the cease and desist request the reason may be automatically populated and/or prefilled into each individual account as an account level reason for reporting the cease and desist request such that the user is prevented from forgetting to provide an individual reason at the account level. In some embodiments, a primary reason reporting the cease and desist request is presented at the top of the customer contact form such that the primary reason reporting the cease and desist request is only automatically populated and/or prefilled into individual accounts for which the user has not yet specified an account level reason for reporting the cease and desist request. For example, if the user has three accounts and has specified a reason for reporting the cease and desist request for the first and second account, the only the third account will be automatically populated with the primary reason for reporting and/or requesting a cease and desist.

In some embodiments, receiving information via the user interface and/or form for reporting cease and desist requests 400 may further comprise importing information into one or more information fields within the user interface and/or form. The fields may be populated based on information that is available to the business entity and either stored locally or remotely accessible by the system for the purpose to importing the information into the user interface and/or form for reporting cease and desist requests 400. For example, various items of required information may be previously known to the system based either on the initial terms of the agreement between the entity and the customer (e.g. customer contact numbers, accounts numbers, and the like) or based on the representative associated with the customer communication and/or cease and desist request (e.g. associated name, manager name, and the like). As such, the system may access the information previously known to the system and import at least portion of the information into the user interface and/or form for reporting cease and desist requests 400.

In some embodiments, receiving information within the user interface and/or form for reporting cease and desist requests 400 may further comprise verifying the received information for accuracy and completion. In such an embodiment, the system may have pre-defined criteria for information that must be explicitly provided by the user such as the requestor's name and customer contact origin. As such, the system may be further configured to review the received request and/or information provided via user input to verify that each item of required information has been provided. In an instance where one or more items of required information are determined to be missing from the received request, the system may then be configured to present an error message (in an instance where the user attempts to submit and/or save the request prior to providing the missing information) and further prompt the requesting entity to provide the missing items of information prior to submitting and/or saving the cease and desist request. In some embodiments, the received request is received in response to the user saving the user input provided within the user interface such that the request will not be submitted until the missing items of required information have been provided. The system may be further configured to review the received cease and desist request to verify that each item of required information is accurate. For example, the system may verify that the inputted customer name and account number(s) are parameters of valid accounts associated with the entity. In an instance where one or more items of required information are determined to be invalid, the system may then be configured to present an error message (in an instance where the user attempts to submit and/or save the cease and desist request prior to providing valid information) and further prompt the requesting entity provide the invalid items of information prior to submitting and/or saving the request.

In some embodiment receiving a cease and desist request further comprises the system being configured to maintain a record/history of cease and desist request and/or withdrawal request such that the history is searchable by either the entity associated with the account, the customer, or a third party entity. As such cease and request, cease and desist withdrawal request, and dialer file archives may be maintained for by the system for a predetermined time period, permanently, or until prompted to be removed by a particular entity.

Regarding block 130, after receiving information via the user interface and in particular receiving a cease and desist request associated with a customer having at least one account maintained by an entity, the system may be configured to automatically terminate contact to the customer on behalf of the entity based at least partially on the at least one rule specified in the cease and desist request. In some embodiment, the cease and desist request is received and processed in real-time such that after receiving the request the system may initiate one or more steps to immediately terminate contact to the customer on behalf of the entity. For example, a first representative associated with the entity may receive and process a cease and desist request on behalf of the customer such that a second representative associated with the entity is simultaneously restricted, and/or informed of the request and unable to contact the customer.

In some embodiments, the customer is contacted on behalf of the entity using an automated dialer (also referred to as an autodialer). The autodialer may be used to contact any telephone number assigned to a paging service, cellular telephone service, specialized mobile radio service, or other radio common carrier service, or any service for which the called party is charged for the call. An autodialer is a computerized and/or mechanical system for communicating with a contact, such as an autodialer for dialing phone numbers. Analogous systems for email, text messages, or the like may also be considered autodialers. As such in some embodiments, terminating contact to the customer on behalf of the entity may further comprise blocking the autodialer from dialing and/or messaging one or more phone numbers associated with the customer. In an alternative embodiment, the customer is contacted on behalf of the entity via manual dialing by a representative associated with the entity. As such, in some embodiments, terminating contact to the customer on behalf of the entity may comprise prompting or informing the representative that the customer has been temporarily restricted from receiving contact.

In some embodiments, a dialer file comprising one or more telephone numbers associated with each of the customer accounts is stored in the memory. In such an embodiment, telephone numbers within the dialer file may be temporary restricted from contact on behalf of the entity if the number and/or accounts are associated with a cease and desist request. The restriction of the telephone numbers may result in the creation of a modified dialer file for use in contacting customers during business hours. The system may then automatically terminate contact to one or more customers in response to numbers being excluded from the dialer file. In this way the autodialer does not have access to the telephone number for automated dialing, and a representative of the entity does have access to view the telephone number for the purpose of manually dialing the customer. In some embodiments, the dialer file is generated prior to the beginning of the business day such that a customer may still be contacted if the cease and desist request is received after the dialer file has been generated for the day. In other embodiments, the dialer file is periodically regenerated throughout the day such that a customer may be potentially contacted during a period of time after the cease and desist request is received until the dialer file is regenerated and configured to exclude the telephone numbers and/or accounts associated with the newly received request. In yet another embodiment, the dialer file is automatically regenerated in response to receiving the cease and desist request such that contact to the customer is immediately terminated in response to the request being received. In an embodiment, where the cease and desist request is received prior to the dialer file being regenerated to include the request and exclude the associated telephone numbers and/or accounts, the system may present the representative with a warning message indicating the customer telephone numbers and/or accounts have been associated with a cease and desist request and the representative is not permitted to contact the customer on behalf of the entity. The warning message may be presented prior to removing the telephone number from the call list and/or dialer file.

In some embodiments creating the dialer file comprises the system being configured to determine to exclude a telephone number from the dialer file in response to determining the telephone number is associated with a cease and desist request. In other embodiments, creating the dialer file comprises the system being configured to determine to exclude a telephone number from the dialer file in response to determining the account related to the telephone number is associated with a cease and desist request.

In some embodiments, a customer level call list comprising one or more telephone numbers associated with the customer is stored in the memory. As shown in FIG. 4, the call list may be further associated with a customer's account such that particular telephone numbers are tied to the associated account and displayed within the user interface for reporting cease and desist requests. In such an embodiment at least one rule with the cease and desist request may specify a telephone number within the call list to be restricted from future contact on behalf of the entity. The system may then automatically terminate contact to the customer by removing the specific telephone number from the call list such that after removing the specific telephone number from the call list the customer cannot be contacted at the specific telephone number on behalf of the entity. In this way the autodialer does not have access to the telephone number for automated dialing, and a representative of the entity does have access to view the telephone number for the purpose of manually dialing the customer.

In some embodiments, a customer may specify time periods (e.g. times of days, weeks, months, quarters, years, and the like) in which they are available and/or unavailable to be contacted. In this way, as shown in FIG. 4, the user interface for reporting cease and desist requests may further comprise an "inconvenient time to call time" for specifying the time periods. In such an embodiment at least one rule with the cease and desist request may specify a time period in which the customer does not want to be contacted by the entity. The system may then automatically terminate contact to the customer by restricting the entity from contacting the customer during the specified period of time. In this way the autodialer may be restricted from automatically dialing the customer during specific periods of times based on the rules, and a representative of the entity may be restricted from manually dialing the customer during specific periods of time. In some embodiments, a representative of the entity may be restricted from manually dialing the customer by disabling their phone or contact device from being able to dial the customer's numbers. In other embodiments, as shown in FIG. 6, the representative of the entity may be restricted from manually dialing the customer by presenting the representative with one or more visual indicators 600 within the unified application 200 that indicate the customer has implemented a cease and desist request and/or request and should therefore not be contacted.

In some embodiments, automatically terminating contact to the customer on behalf of the entity may be based at least partially on the contact mode or method of the business entity. For example, the entity may either operate using an automated contact method (e.g. autodialer), a manual contact method (e.g. manual calls initiated by representatives of the entity), or a combination of methods. In either contact mode or method, the representative may be automatically presented accounts on the user interface for contacting the customer. In one embodiment, automatically terminating contact to the customer on behalf of the entity may comprise the system being configured to skip and/or restrict any accounts that have been associated with cease and desist request from being presented on the user interface for contacting customers. For example, in some embodiments, if the cease and desist request is not associated at an account level and at least one telephone number associated with the customer account is eligible for contact and not associated with the cease and desist request then the system may still present the account to the representative to initiate contact to the user on behalf of the account. In alternative embodiments, if the cease and desist request is associated at an account level the system may determine skip presentation of the account to the representative based at least partially in response to determining the account is associated with a cease and desist request.

In some embodiments, the system may operate in a manual call mode in which the representative specifies a preference for which telephone number the system should present when presenting the customer account in the user interface for manual dialing. For example, the representative may specify that the system present work telephone numbers when the customer is being contacted during business hours. In an embodiment, where the work telephone number is associated with a cease and desist request the system may then override the preference and automatically determine to present an alternative number (e.g. home telephone number or cell phone number) despite the representatives preference.

In some embodiments, the customer may have a plurality of accounts maintained by the entity (e.g. a first and a second account maintained by the entity) such that the cease and desist request is not associated with all of the accounts (e.g. only associated with the first account). As shown in FIG. 4, a user may "select all accounts" to associate with the cease and desist request with every account that the customer has maintained by the entity, or the user may select to customize the preferences of the cease and desist request at an account level such that is only associated with one or more of the customer's accounts. In such an embodiment at least one rule with the cease and desist request may specify that the cease and desist request is only associated with a first account of the user such that the system may then automatically terminate contact to the customer by determining to not contact a customer based at least partially on determining the reason for contacting the customer is associated with the first account, and determining to contact a customer based at least partially on determining the reason for contacting the customer is associated with the second account. In this way the autodialer may be configured to determine on an individual account level whether or not a cease and desist requests has been received regarding a specific account and further determine not to dial the one or more phone numbers associated with the specific account. As such, the different accounts may have similar and/or different phone numbers and contact information associated with them such that at least a portion of information is restricted from contact if associated the customer's account level cease and desist request.

In some embodiments, as previously discussed, the system is further configured to receive a request to reverse and/or withdraw the cease and desist request associated with a customer having the at least one account maintained by an entity. In such an embodiment, the request to reverse and/or withdraw the cease and desist request specifies at least one rule for contacting the customer such that in response to receiving the request to withdraw the cease and desist request, the system may automatically initiate contact to the customer on behalf of the entity based at least partially on the at least one rule specified in the request to withdraw the cease and desist request. In some embodiments, initiating contact to the customer on behalf of the entity may further comprise unblocking the autodialer from dialing and/or messaging one or more phone numbers associated with the customer. In some embodiments, initiating contact to the customer may comprise adding one or more telephone numbers to the call list such that after the telephone numbers are added to the call list the customer can be contacted at a specific telephone number on behalf of the entity. In some embodiments, the system may automatically initiate contact to the customer by removing any restrictions related to the entity contacting the customer during the specified period of time.

FIG. 7 provides a block diagram illustrating an exemplary financial institution banking system 700 in greater detail, in accordance with embodiments of the invention. The banking system 700 may be the entity system that provides for the system and method disclosed in FIG. 1. As illustrated in FIG. 7, in one embodiment of the invention, the banking system 700 includes a processing device 720 operatively coupled to a network communication interface 710 and a memory device 750. In certain embodiments, the banking system 700 is operated by a first entity, such as a financial institution, while in other embodiments the banking system 700 is operated by an entity other than a financial institution.

It should be understood that the memory device 750 may include one or more databases or other data structures/repositories. The memory device 750 also includes computer-executable program code that instructs the processing device 720 to operate the network communication interface 710 to perform certain communication functions of the banking system 700 described herein. For example, in one embodiment of the banking system 700, the memory device 750 includes, but is not limited to, a network server application 770, a customer account data repository 780, which includes customer account information 784, a decision engine 790, a request monitoring routine 792, and other computer-executable instructions or other data. The computer-executable program code of the network server application 770 or the request monitoring routine 792 may instruct the processing device 720 to perform certain logic, data-processing, and data-storing functions of the banking system 700 described herein, as well as communication functions of the banking system 700.

In an embodiment, the customer account data repository 780 includes customer account information 784. The customer account information may include account history for the customer, demographic information for the customer, any notations made by the customer or a representative on the customer's file, and the like.

In some embodiments, the request monitoring routine 792 facilitates monitoring of explicit and implicit cease and desist requests received from the customer. In an embodiment, the request monitoring routine 792 tracks when request is received from a customer to discontinue using a contact to communicate with the customer via one or more channels. For example, the request monitoring routine 792 may identify when implicit request has been demanded by the customer, based on the system and method disclosed in FIG. 1, and update the customer information with the implicit request.

As used herein, a "communication interface" generally includes a modem, server, transceiver, and/or other device for communicating with other devices on a network, and/or a user interface for communicating with one or more users. Referring again to FIG. 7, the network communication interface 710 is a communication interface having one or more communication devices configured to communicate with one or more other devices on the network, such as a representative work station, an autodialer, a customer contact, and the banking system 700. The processing device 720 is configured to use the network communication interface 710 to transmit and/or receive data and/or commands to and/or from the other devices connected to a network to allow communication between the devices.

FIG. 8 provides a block diagram illustrating technical components for a system 800 for determining request to contact, in accordance with an embodiment of the present disclosure. As illustrated, the system 800 includes a customer 810, an entity computer platform 820, a representative workstation 830 for a representative 812 and a network 840. It will be understood that the representative 812 has access to the representative workstation 830.

As shown in FIG. 8, the entity computer platform 820 and representative workstation 830 are each operatively and selectively connected to the network 840, which may include one or more separate networks. In addition, the network 840 may include a local area network (LAN), a wide area network (WAN), and/or a global area network (GAN), such as the Internet. It will also be understood that the network 840 may be secure and/or unsecure and may also include wireless and/or wireline technology. The network 840 may be used to communicate with the customer 810 via the contact.

As shown in FIG. 8, in accordance with some embodiments of the present invention, the representative workstation 830 includes a communication interface 832, a processor 833, a memory 834 having a pop-up routine 835 stored therein, an autodialer or a connection to an autodialer 836, and a user interface 837. In such embodiments, the communication interface 832 is operatively and selectively connected to the processor 833, which is operatively and selectively connected to the user interface 837, the memory 834 and the autodialer 836.

The user interface 837 may allow the representative workstation 830 to receive data from the customer 810. In an embodiment, the representative workstation 830 may include any of a number of devices allowing the representative 812 to control the representative workstation 830 and communicate with the customer 850, such as a keypad, keyboard, touch-screen, touchpad, microphone, mouse, joystick, stylus, other pointer device, button, soft key, and/or other input device(s). In some embodiments, the user interface 837 also includes one or more user output devices, such as a display and/or speaker, for presenting information to the representative 812.

Each communication interface described herein, including the communication interface 832 and 822, generally includes hardware, and, in some instances, software, that enables a portion of the system 800, such as the processor 833 to transport, send, receive, and/or otherwise communicate information. For example, the communication interface 832 of the representative workstation 830 may include a modem, server, electrical connection, and/or other electronic device that operatively connects the representative workstation 830 to another electronic device, such as the electronic devices that make up the entity computer platform 820 and/or the electronic device of the customer 810.

Each processor described herein, including the processor 833 and 824, generally includes circuitry for implementing the audio, visual, and/or logic functions of that portion of the system 800. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 834 of the representative workstation 830 and the memory 826 of the entity computer platform 820.

Each memory device described herein, including the memory 834 for storing the pop-up routine 835 and the memory 826 of the entity computer platform 820, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 8, the memory 834 of the representative workstation 830 includes the pop-up routine 835. The pop-up routine 835 provides alerts and/or information to the representative relating to the customer, the contact, or the call. For example, the pop-up routine may determine that the customer resides in a state having restrictions on certain questions during a phone call from a financial institution. The pop-up routine would display a special screen before or during the communication with the customer providing information on the restrictions. In some embodiments, the pop-up routine 835 includes computer-executable program code portions for instructing the processor 833 to perform one or more of the functions of the pop-up routine 835 described and/or contemplated herein.

It will be understood that the representative workstation 830 can be configured to implement one or more portions of the process flows described and/or contemplated herein. For example, in some embodiments, the representative workstation 830 is configured so that the communication interface 832 is operatively and selectively linked to the entity computer platform 820 to receive autodialing campaigns or connect to an autodialer. For instance, information regarding the customers that will be contacted during an autodialing campaign, e.g. contacts, account history, or the like. In other embodiments (not shown) an application may be stored in the memory 834 of the representative workstation 830 that enables the workstation to perform some or all of the steps of process flow 100.

FIG. 8 also illustrates a entity computer platform 820, in accordance with an embodiment of the present invention. The entity computer platform 820 may include any computerized apparatus that can be configured to perform any one or more of the functions of the entity computer platform 820 described and/or contemplated herein. In accordance with some embodiments, for example, the entity computer platform 820 may include an engine, a platform, a server, a database system, a front end system, a back end system, a personal computer system, and/or the like. In some embodiments, such as the one illustrated in FIG. 8, the entity computer platform 820 includes a communication interface 822, a processor 824 and a memory 826. In some embodiments, as illustrated in FIG. 8, customer data (such as contacts, transactional data, account history data, social network data and Internet data) 827, a decision engine 828 for determining request, and an autodialing routine 829 may be stored in memory 826. The customer data 827 may have been previously collected and stored in the memory 826 of the entity computer platform 820, or the entity computer platform may actively collect customer data 827 by using the communication interface 822 to access the network 840 and only temporarily saves the customer data 827 to the memory to be accessed by the processor 824. The communication interface 822 is operatively and selectively connected to the processor 824, which is operatively and selectively connected to the memory 826.

It will be understood that the entity computer platform 820 can be configured to implement one or more portions of the process flows described and/or contemplated herein. For example, in some embodiments, the entity computer platform 820 is configured so that the processor uses a decision engine to determine when request has been received and then instructs the autodialer to communicate with the customer via the contact. In certain embodiments the autodialing routine 829, stored in memory 826, is configured to control an autodialer. The autodialer may be integral with the system or may be external to the system yet connected over the network 840. In yet other embodiments, the decision engine 828 stored in memory 826 is configured to determine if request is needed and, if so, determine if request has been received.

It will be understood that the embodiment illustrated in FIG. 8 is exemplary and that other embodiments may vary. For example, in some embodiments, some or all of the portions of the system 800 may be combined into single portion. Specifically, in some embodiments, the entity computer platform 820 is configured to perform all of the same functions of those separate portions as described and/or contemplated herein. Likewise, in some embodiments, some or all of the portions of the system 800 may be separated into two or more distinct portions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for terminating customer contact procedures based on cease and desists requests, the system comprising:
    a memory;
    one or more computing processors; and
    a software module stored in the memory, said software module comprising instruction code executable by one or more computing processors, and configured to cause the one or more computing processors to:

provide a user interface for reporting cease and desist requests associated with a plurality of customers;

receive, via user input into the user interface, a cease and desist request associated with a customer having one or more accounts maintained by an entity, wherein the cease and desist request specifies at least one rule to be implemented when contacting the customer, and wherein the cease and desist request comprises a customized selection of the one or more accounts to associate with the cease and desist request;

in response to receiving the cease and desist request, automatically terminate contact to the customer on behalf of the entity based at least partially on the at least one rule specified in the cease and desist request, wherein a representative workstation is blocked from contacting the customer;

receive, via user input into the user interface, a cease and desist reversal associated with the customer, wherein the cease and desist reversal specifies at least part of the cease and desist request the customer desires to reverse; and in response to receiving the cease and desist reversal, automatically unblock a representative workstation and reinstitute contact to the customer on behalf of the entity based at least partially on the specified at least part of the cease and desist request the customer desires to reverse.

2. The system of claim 1, wherein the entity contacts the customer using an automated dialer, and wherein automatically terminating contact to the customer on behalf of the entity comprises:

blocking the automated dialer from dialing one or more telephone numbers associated with the customer.

3. The system of claim 2, wherein a call list comprising the one or more telephone numbers associated with the customer is stored in the memory, and wherein the at least one rules provides a specific telephone number within the call list to be restricted from future contact on behalf of the entity, and wherein automatically terminating contact to the customer on behalf of the entity comprises:

removing the specific telephone number from the call list such that after removing the specific telephone number from the call list the customer cannot be contacted at the specific telephone number on behalf of the entity.

4. The system of claim 3, wherein the at least one rules provides a specific period of time to be in which the entity is restricted from contacting the customer, and wherein automatically terminating contact to the customer on behalf of the entity comprises:

restricting the entity from contacting the customer during the specific period of time.

5. The system of claim 1, wherein the customer has a first and second account maintained by the entity, and wherein the cease and desist request is only associated with the first account such that automatically terminating contact to the customer on behalf of the entity comprises:

determining to not contact a customer based at least partially on determining the reason for contacting the customer is associated with the first account; and determining to contact a customer based at least partially on determining the reason for contacting the customer is associated with the second account.

6. The system of claim 5, wherein the user interface for reporting cease and desist requests is configured to receive at least one reason for reporting the cease and desist request such that at least a portion of the user input within the user interface is automatically populated based at least partially on the at least one reason for reporting the cease and desist request.

7. The system of claim 1, wherein the system is further configured to:

receive, via user input into the user interface, a request to withdraw the cease and desist request associated with a customer having the one or more accounts maintained by the entity, wherein the request to withdraw the cease and desist request specifies at least one rule for contacting the customer; and in response to receiving the request to withdraw the cease and desist request, automatically initiate contact to the customer on behalf of the entity based at least partially on the at least one rule specified in the request to withdraw the cease and desist request.

8. A computer program product for determining permission to contact, the computer program product comprising:

a non-transitory computer readable storage medium having computer readable program code embodied therewith, the computer readable program code comprising:

a computer readable program code configured to provide a user interface for reporting cease and desist requests associated with a plurality of customers;

a computer readable program code configured to receive, via user input into the user interface, a cease and desist request associated with a customer having one or more accounts maintained by an entity, wherein the cease and desist request specifies at least one rule to be implemented when contacting the customer, and wherein the cease and desist request comprises a customized selection of the one or more accounts to associate with the cease and desist request;

a computer readable program code configured to in response to receiving the cease and desist request, automatically terminate contact to the customer on behalf of the entity based at least partially on the at least one rule specified in the cease and desist request, wherein a representative workstation is blocked from contacting the customer;

a computer readable program code configured to receive, via user input into the user interface, a cease and desist reversal associated with the customer, wherein the cease and desist reversal specifies at least part of the cease and desist request the customer desires to reverse; and a computer readable program code configured to, in response to receiving the cease and desist reversal, automatically unblock a representative workstation and reinstitute contact to the customer on behalf of the entity based at least partially on the specified at least part of the cease and desist request the customer desires to reverse.

9. The computer program product of claim 8, wherein the entity contacts the customer using an automated dialer, and wherein the computer program product further comprising a computer readable program code configured to block the automated dialer from dialing one or more telephone numbers associated with the customer.

10. The computer program product of claim 8, wherein a call list comprising the one or more telephone numbers associated with the customer is stored in the memory, and wherein the at least one rules provides a specific telephone number within the call list to be restricted from future contact on behalf of the entity, and wherein the computer program product further comprises a computer readable program code configured to:

remove the specific telephone number from the call list such that after removing the specific telephone number from the call list the customer cannot be contacted at the specific telephone number on behalf of the entity.

11. The computer program product of claim 8, wherein the at least one rules provides a specific period of time to be in which the entity is restricted from contacting the customer, and wherein the computer program product further comprises a computer readable program code configured to restrict the entity from contacting the customer during the specific period of time.

12. The computer program product of claim 8, wherein the customer has a first and second account maintained by the entity, and wherein the cease and desist request is only associated with the first account such that the computer program product further comprises a computer readable program code configured to:
 determine to not contact a customer based at least partially on determining the reason for contacting the customer is associated with the first account; and
 determine to contact a customer based at least partially on determining the reason for contacting the customer is associated with the second account.

13. The computer program product of claim 8, wherein the computer program product further comprises a computer readable program code configured to receive at least one reason for reporting the cease and desist request such that at least a portion of the user input within the user interface is automatically populated based at least partially on the at least one reason for reporting the cease and desist request.

14. The computer program product of claim 8, wherein the computer program product further comprises a computer readable program code configured to:
 receive, via user input into the user interface, a request to withdraw the cease and desist request associated with a customer having the one or more accounts maintained by the entity, wherein the request to withdraw the cease and desist request specifies at least one rule for contacting the customer; and
 in response to receiving the request to withdraw the cease and desist request, automatically initiate contact to the customer on behalf of the entity based at least partially on the at least one rule specified in the request to withdraw the cease and desist request.

15. A method for determining permission to contact, the method comprising:
 providing, via a computing device processor, a user interface for reporting cease and desist requests associated with a plurality of customers;
 receiving, via a computing device processor, via user input into the user interface, a cease and desist request associated with a customer having one or more accounts maintained by an entity, wherein the cease and desist request specifies at least one rule to be implemented when contacting the customer, and wherein the cease and desist request comprises a customized selection of the one or more accounts to associate with the cease and desist request;
 in response to receiving the cease and desist request, automatically terminating, via a computing device processor, contact to the customer on behalf of the entity based at least partially on the at least one rule specified in the cease and desist request, wherein a representative workstation is blocked from contacting the customer;
 receiving, via user input into the user interface, a cease and desist reversal associated with the customer, wherein the cease and desist reversal specifies at least part of the cease and desist request the customer desires to reverse; and
 in response to receiving the cease and desist reversal, automatically unblock a representative workstation and reinstituting contact to the customer on behalf of the entity based at least partially on the specified at least part of the cease and desist request the customer desires to reverse.

16. The method of claim 15, wherein the entity contacts the customer using an automated dialer, and wherein automatically terminating contact to the customer on behalf of the entity comprises:
 blocking the automated dialer from dialing one or more telephone numbers associated with the customer.

17. The method of claim 15, wherein a call list comprising the one or more telephone numbers associated with the customer is stored in the memory, and wherein the at least one rules provides a specific telephone number within the call list to be restricted from future contact on behalf of the entity, and wherein automatically terminating contact to the customer on behalf of the entity comprises:
 removing the specific telephone number from the call list such that after removing the specific telephone number from the call list the customer cannot be contacted at the specific telephone number on behalf of the entity.

18. The method of claim 15, wherein the at least one rules provides a specific period of time to be in which the entity is restricted from contacting the customer, and wherein automatically terminating contact to the customer on behalf of the entity comprises:
 restricting the entity from contacting the customer during the specific period of time.

19. The method of claim 15, wherein the customer has a first and second account maintained by the entity, and wherein the cease and desist request is only associated with the first account such that automatically terminating contact to the customer on behalf of the entity comprises:
 determining to not contact a customer based at least partially on determining the reason for contacting the customer is associated with the first account; and
 determining to contact a customer based at least partially on determining the reason for contacting the customer is associated with the second account.

20. The method of claim 15, wherein the user interface for reporting cease and desist requests is configured to receive at least one reason for reporting the cease and desist request such that at least a portion of the user input within the user interface is automatically populated based at least partially on the at least one reason for reporting the cease and desist request.

* * * * *